May 10, 1966  E. H. RUSH  3,250,113
EXPENDABLE PIPELINE PLUG
Filed Nov. 27, 1963  4 Sheets-Sheet 1

INVENTOR:
E. H. RUSH
BY Theodore E. Bieber
HIS ATTORNEY

May 10, 1966  E. H. RUSH  3,250,113
EXPENDABLE PIPELINE PLUG
Filed Nov. 27, 1963  4 Sheets-Sheet 2

INVENTOR:
E. H. RUSH
BY Theodore E. Beeber
HIS ATTORNEY

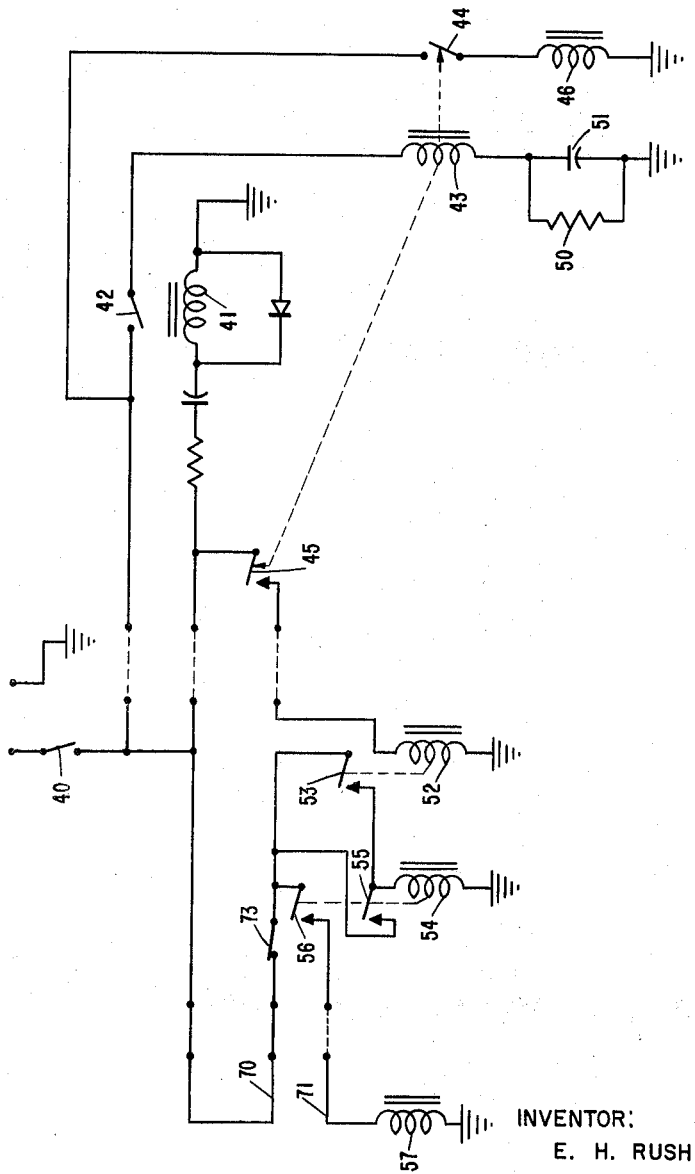

May 10, 1966

E. H. RUSH 3,250,113

EXPENDABLE PIPELINE PLUG

Filed Nov. 27, 1963

INVENTOR:
E. H. RUSH

BY: Theodore E. Bieber

HIS ATTORNEY

United States Patent Office 3,250,113
Patented May 10, 1966

3,250,113
EXPENDABLE PIPELINE PLUG
Elmer H. Rush, Glendale, Calif., assignor to Shell Oil Company, New York, N.Y., a corporation of Delaware
Filed Nov. 27, 1963, Ser. No. 326,405
1 Claim. (Cl. 73—3)

This invention relates to apparatus for use with pipelines, and pertains more particularly to the use of an additive liquid injected into the line which will travel along the line with the fluid being transported, and perform the same function as a scraper or plug by giving signals upon its arrival at specific locations along the pipeline, then becoming ultimately completely dispersed in the pipeline fluid to be undetectable and not cause degradation of any part of the product.

Pipe line scrapers, also known as "go-devils" or "pigs" are commonly used in pipelines for proving flow meters of the inferential, differential, or positive displacement types as explained in United States Patent No. 2,772,561. Pipeline scrapers or go-devils are also used in pipelines as flags to identify particular points in the flowing liquid stream, as for example the interface between two fluids. Deformable spheroids are similarly used to prove flow meters or identify particular points in the liquid stream.

In the past, the physical handling of scrapers, go-devils or spheroids has proved to be an expensive and time-consuming procedure. It has been necessary to manually place scrapers in a sending barrel, manually remove them from a receiving barrel, and transport them back to the sending location. This procedure has become more and more laborious, impractical and inefficient as pipe line sizes have increased to the point where scrapers are too heavy and too large in physical dimensions to be easily handled. The physical appurtenances such as valves, scraper barrels, operating and control devices, etc., for large size pipeline scraper handling are expensive and bulky, requiring considerable expenditure on construction, and requiring considerable space for continued proper operation. Scrapers are also impractical to handle in lines of extremely small sizes.

A number of different liquids have been used as plugs or flags in a flowing fluid stream in an attempt to accomplish the same result as is obtained with a scraper. These various liquids which have been added to the pipeline stream have various disadvantages. The use of water as a flag or plug has the disadvantage of introducing a detrimental substance into the hydrocarbon product and pipeline, and frequently can not be readily separated from the product. Detection of the water plug or flag is usually accomplished by means of dielectric constant measuring equipment, and is not always reliable because of the variations in dielectric constant of the product. Another disadvantage of water is that large quantities are required to obtain a significant indication thus degrading the fluid in the pipeline.

Another liquid frequently used as a plug or flag, is one of the many formulations of alcohol. The use of alcohol has many of the same disadvantages as the use of water, namely large volume, the use of dielectric constant as a sensing means, plus the degradation of the product.

Radioactive materials have been used as a plug or flag in pipe lines and are sensed by radioactivity sensing devices which are common to the art. Radioactive materials have the disadvantage of product deterioration and contamination plus the added disadvantage of possible physical harm to those people who might come in contact with the radioactive material or the fluid containing it.

It is, therefore, a primary object of this invention to provide a liquid plug or flag to be injected into a flowing fluid pipeline stream to identify a particular point in the flowing stream, while the pipeline is operating at normal rates of flow and at normal pressures.

A further object of this invention is to provide a liquid plug or flag which will change the electrical resistance or conductance of the fluids in the flowing stream.

Another object of this invention, is to provide a liquid plug or flag which will not be detrimental to fluids flowing in the pipe line and readily mixes with said fluids.

Another object of this invention, is to provide a plug or flag which is injected in extremely small quantities and ultimately is practically undetectable upon chemical analysis of the fluid by usual methods.

Another object of this invention, is to provide a liquid plug or flag which can be equally well adapted to both large and small size pipelines and may be detected with electrical measuring instruments.

This invention proposes the use of a very small quantity of a liquid which has no detrimental effects on hydrocarbon products and may be desirable in hydrocarbon products. The liquid changes the resistance per unit volume to increase the ability of the product to conduct electricity and can, therefore, be detected by simple electrical measuring devices which are commonly used in the measurement of electrical resistance. The cost of equipment for both injection and detection of this material is much less than the equivalent equipment for handling scrapers, is perfectly safe to all personnel involved, requires very little labor and is easily adaptable to either automatic or remote controlled operations.

While any liquid that changes the resistance of the fluid flowing in the pipeline may be used, a satisfactory group of liquids for use in petroleum pipelines are the anti-static additives that are used to increase the conductivity of petroleum products. Anti-static additives usually consist of salts of metals dissolved in light hydrocarbon liquids. Thus, anti-static additives will readily mix with petroleum products and, when used in the manner and concentration herein set forth will not chemically change the hydrocarbon products being transported.

These and other objects of this invention will be understood from the following description taken with reference to the attached drawings wherein:

FIGURE 4 is a schematic circuit diagram for operating the injection apparatus of FIGURE 1;

Figure 1:
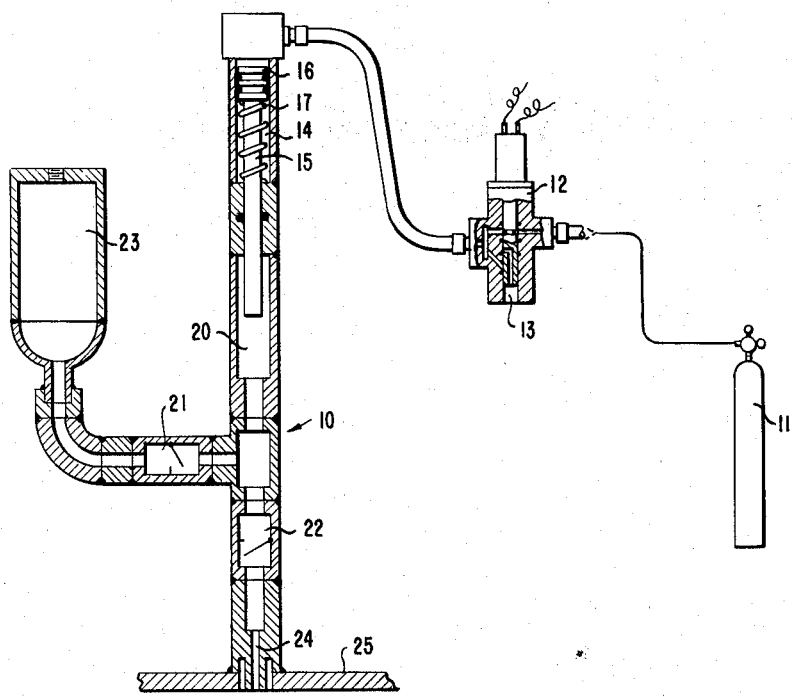
FIGURE 1 is a schematic view illustrating an apparatus for injecting the expendable flag or plug material of the present invention.

Referring now to FIGURE 1 there is shown an injector suitable for injecting the liquid of this invention into a flowing fluid stream in a pipeline. The injector 10 is powered by a compressed gas supply 11 preferably an inert gas as for example nitrogen. The flow of compressed gas to the injector 10 is controlled by means of a solenoid operated four way valve 12, the power cylinder of the injector being exhausted through an outlet 13. The injector consists of an upper piston chamber or power cylinder 14 having an injection rod 15 disposed therein. The injecting rod 15 is driven downwardly by a piston 16 mounted on the upper end of the injecting rod. The injecting rod 15 is returned to its upper position by means of a spring 17 disposed below the piston 16. The injection rod 15 when driven downward forces the liquid out of the injection chamber 20, through the check valve 22 and nozzle 24 and into the stream flowing in the pipeline 25. The inlet to the injection chamber 20 is controlled by a check valve 21 while a supply of the fluid is contained in a chamber 23. From the above description it is easily seen that the injecting rod 15 when driven downward by the admission of compressed gas to the top of the piston 16 will rapidly inject a metered amount of fluid into the pipeline 25. After a suitable time delay the solenoid valve 12 is operated to close the inlet and open the exhaust 13 to permit the spring 17 to return the injecting rod to its upper position as shown in FIGURE 1. As the injecting rod 15 returns to its upper position it will draw a new supply of fluid from the chamber 23 into the injection chamber 20 through the check valve 21. The injector will then be in an operating position to again inject a metered amount of fluid into the stream 25. The important feature of the injector 15 is that it injects the required amount of fluid in as short a time interval as possible. The amount of fluid injected into the stream 25 as explained above is an extremely small amount. For example, it is found that one cubic inch is sufficient to produce a suitable flag or plug for calibrating flow meters in 14 inch pipelines. The fluid and the amount required will be explained in more detail below.

Figure 2:
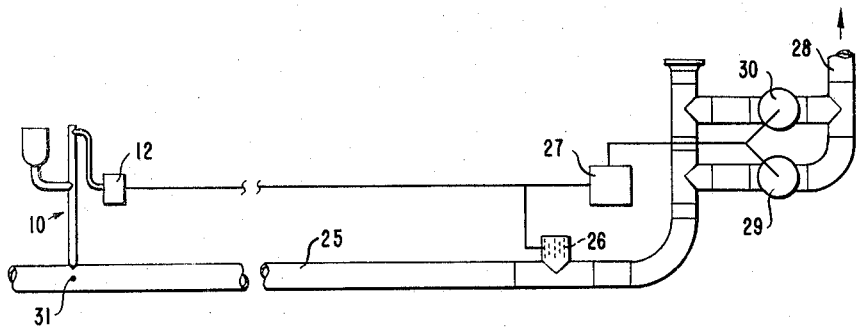
FIGURE 2 is a schematic view of a system for calibrating flow meters using the expendable flag or plug material of this invention.

Referring now to FIGURE 2, there is shown a system for using the expendable plugs of this invention to provide meter proving means for two flow meters 29 and 30. The injector 10 is positioned on the pipeline 25 a known distance upstream from a detecting station 26, for example one-half mile. Of course, the exact distance between the injector 10 and detecting station 26 will depend on many variables including the size of the pipeline. Solenoid valve 12 is coupled to a detector electronic circuit 27. The detecting station consists of a detecting probe 26 preferably in the form of a plurality of parallel plates that are disposed in the pipeline 25. The probe is designed to detect the conductivity of the stream flowing in the pipeline 25 and is coupled to the electronic circuit 27 that controls the operation of the injector 10 as well as the meters 29 and 30. In addition, the circuit 27 measures or determines the conductivity of the stream flowing past the probe 26 and when this conductivity increases above a background level it is capable of stopping auxiliary registers on the two meters 29 and 30. The circuit 27 can of course be any circuit capable of measuring direct current quantities.

The system shown in FIGURE 2 is used to calibrate, prove or check the meters 29 and 30. More particularly, the expendable plug material is injected at a point 31 upstream from the detecting station 26. The volume contained in the pipeline between the injection point and receiving probe point can easily be determined by calibration or calculation. Obviously, this quantity of material will flow past the detecting station and through the meters while the expendable plug is passing between the two points. This method for proving meters is more completely described and shown in the above-referenced patent. The expendable plug of the present invention is substituted for the scrapers disclosed in the referenced patent.

The liquid additive injected in the fluid stream flowing in the pipeline to increase its conductivity may take various forms although a preferred material consists of salts of metals having atomic numbers from 22–28 and relatively high molecular weight aromatic carbolic or sulfonic acids. These metals, viz. titanium, vanadium, chromium, manganese, iron, cobalt and nickel have variable valences including +3. Particularly preferred salts are those of the above metals in the trivalent state, especially such salts of chromium. The aromatic carboxylic or sulfonic acids from which the salts are derived are preferably aromatic carboxylic acids especially alkyl hydroxyaryl-carboxylic acids such as alkylated salicylic acids. The above salt and organic acids are dissolved in a light hydrocarbon with concentration by weight of 50–60% dry material. At times it is desirable to improve the stability of the additive by combining a copolymer vinyl pyridine. Reference is made to Patent No. 3,013,868 for a more complete description of materials suitable for use in increasing the conductivity of hydrocarbon fluids. The material used should be readily soluble in hydrocarbon products in order that the specific gravity of the additive fluid injected will substantially equal the specific gravity of the products flowing in the pipeline. This insures that the additive fluid injected at an interface formed by two different liquids will disperse into the two liquids forming the interface in a manner that closely approximates the actual dispersion of the liquids. The actual dispersion of the marking fluid in the hydrocarbon stream is primarily due to eddy diffusion and secondarily the result of a molecular diffusion. This, of course, insures that the additive diffuses in the stream in approximately the same manner as the two products will diffuse in each other.

Field tests have confirmed that the dispersion of the above additive material approximates the dispersion of two liquid hydrocarbons in each other. Typical interface volumes for a 240-mile trip in a 14-inch pipeline with a gasoline-kerosene interface are as follows:

From actual operating experience, using samples of the pipeline fluid to determine the dispersion of one material in the other, the interface was found to be approximately 700–900 barrels. The measured spread using the above-refrenced additive materials as an expendable flag or plug have indicated a 700–800 barrels dispersion of the additive in the flowing streams.

Figures 3A, 3B, 3C:
FIGURE 3 is a series of wave forms showing the signals obtained using the liquid of this invention and the system of FIGURES 1 and 2.
Figures 3D, 3E, 3F, 3G:
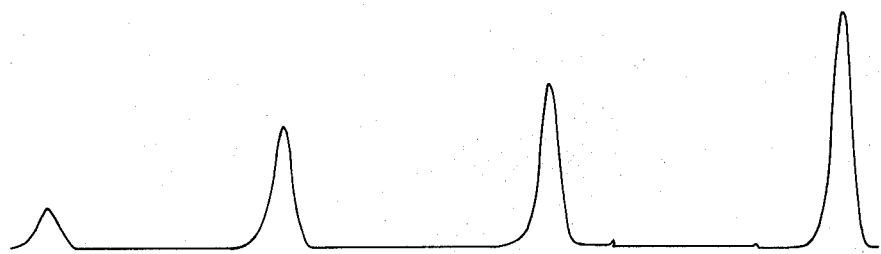

Similarly, 1 to 4 cubic inches of additive liquid were injected 4,800 feet ahead of a detecting station in a 14-inch pipeline. The measured diffusion of the additive appeared to be 35–40 barrels while the calculated diffusion was 40 barrels. From the above figures it is easily seen that the dispersion of the material within the products flowing in the pipeline closely approximate the actual dispersion of two different materials in the pipeline. Further, the material increases the conductivity of the fluids flowing in the pipeline to the extent necessary to permit the detection of the passage of the interface as marked by the expendable plug. The signal produced by the probe placed in the pipeline is actually indicative of the concentration of the additive material contained in the flowing stream. This signal rises from a background level to a peak value and then again descends to a background level with the envelope of the signal closely approximating the dispersion of the additive in the flowing stream. As will be explained below this phenomena can be used to initiate various control operations of physical equipment such as valves and pumps to control the disposition of materials arriving at a terminating point, as for instance the distribution of gasoline to a gasoline tank and furnace oil to a furnace oil tank, and at the same time removing the intermixed portion of the two products to a separate storage vessel, thus maintaining both products substantially pure. FIGURE 3 illustrates a series of signal forms that indicate the charcter of the signal and reproducibility of the system shown in FIGURES 1 and 2. The actual form of the signal as shown in FIGURE 3 is referred to as a signature to distinguish it from the signal in general. More particularly, the signals in FIGURES 3A, 3B and 3C are the signatures from three consecutive injections of 2 cubic inches of additive into a 14-inch pipeline. The pipeline was transporting kerosene at a rate of 3150 barrels per hour. It is easily seen that these signatures have substantially identical amplitudes and widths indicating that the liquid forms a marker having excellent reproducibility. FIGURES 3D, 3E, 3F and 3G illustrate four consecutive injections of one, three-quarters, one-half and one-quarter cubic inch respectively. The pipeline was transporting 115 octane gasoline at a rate of 4260 to 4300 barrels an hour at the time of the injection. While the above data is representative, the quantity injected may vary over a wide range depending on the size of the pipeline and the distance between the point of injection and point of detection.

Referring now to FIGURE 4 there is shown the circuit in schematic form for controlling the operation of the injector 10 and the meter operating circuits shown in FIGURES 1 and 2. The switch 40 may be manually closed to initiate the operation of the system. When the switch 40 is closed the circuit to a sensitive relay coil 41 will be energized. When the relay coil 41 is energized it will close the contacts 42 thus energizing a time delay relay coil 43 to close the contacts 44 and 45. The closing of the contacts 44 supplies power to the coil 46 that operates the solenoid valve 12 shown in FIGURE 1. Similarly, the closure of the contacts 45 supplies power to the remainder of the circuit shown in FIGURE 4 and signals the detector station that an injection of marking fluid has been made. After a suitable time delay, for example, one second, as determined by the resistance 50 and the capacity 51 the time delay relay coil 43 is de-energized thus opening the contacts 44 and 45. Similarly, the sensitive relay coil 41 is de-energized thus opening the contact 42. The sensitive relay coil 41 is deenergized depending upon its associated circuitry after a suitable time delay. The time delay of the sensitive relay 41 is preferably longer than the time delay of the time delay relay 43.

When the contacts 45 close they will energize the receiving relay coil 52 that to close the contacts 53 that in turn energize the locking relay coil 54. When the locking relay coil 54 is energized it will close the contacts 55 thus locking the relay closed until power is removed from the circuit as explained below. The locking coil 54 will also close the contact 56 to energize the solenoid 57 that controls the operation of the meter register 29 and 30. While no circuit is shown for the actual operation of the auxiliary meter proving registers of the two meters, various circuits are available for controlling these meter registers from the action of solenoid 57.

The operation of the above circuit is initiated by closing the switch 40 that energizes the proper relays to actuate the injector. The injector injects a metered amount of additive fluid into the fluid stream in the pipeline and signals the detecting station that an injection has been made. This signal can be used to start the auxiliary meter proving registers of the meters 29 or 30 by means of the operation of the solenoid 57. The meter registers are stopped when the heaviest concentration of additive in the marker passes the detector 26. Thus, knowing the volume of fluid between the injector and detector one may accurately prove the meter.

Figure 5:
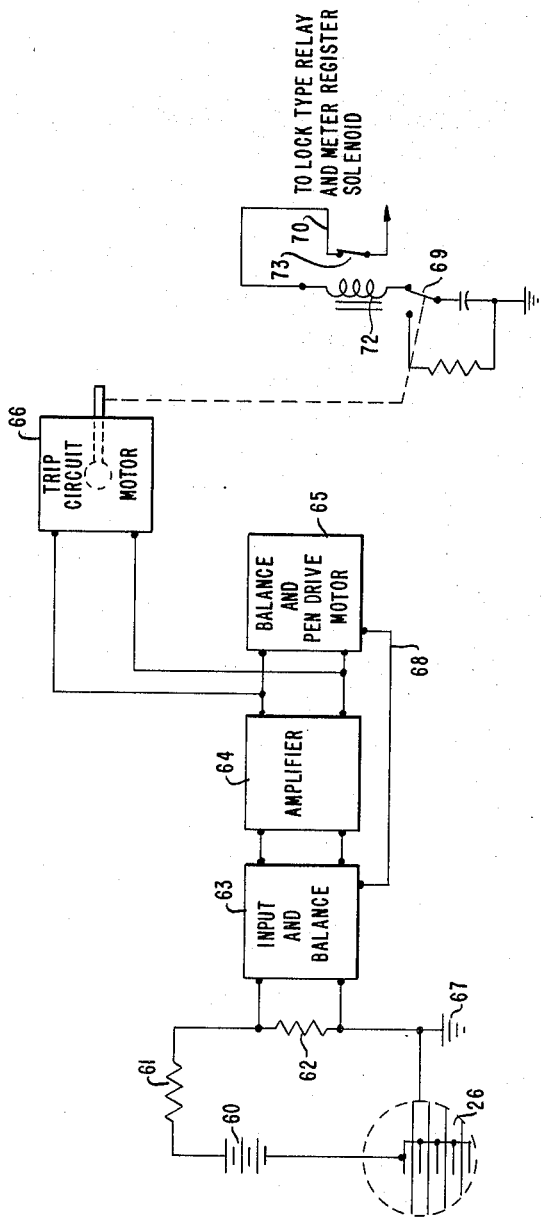
FIGURE 5 is a block diagram of a circuit for use with the meter calibration apparatus of FIGURE 2.

Referring now to FIGURE 5, there is shown in block diagram form a circuit for measuring the passage of the expendable plug past the detector 26. The detector 26 formed from a plurality of parallel plates with alternate plates being connected to the pipeline and to a ground 67 while the remaining plates are coupled together and to a measuring circuit. While the detector is shown as being installed in the main flow stream of the pipeline, excellent results have been obtained with the detector 26 disposed in a closed end stub that projects from the pipeline at right angles. The measuring circuit has a source of direct current potential, as for example, a battery 60 coupled in series with the detector 26 and a ballast resistance 61 and measuring resistance 62. Thus, the current will flow in the measuring circuit depending upon the resistance of the fluid between the plates of the detector 26. The amount of current flowing in the circuit is measured by an input and balancing circuit 63. The circuit 63 contains suitable elements for balancing the current flow to obtain a null balance position in addition to measuring the current flow. The current from the input and balancing circuit 63 is supplied to an amplifier 64 which amplifies the current signal to a sufficient level to operate the pen drive motor 65 as well as the trip circuit motor 66. The pen drive motor 65 may be the motor of an ordinary chart recorder having a pen drive motor that positions a pen and generates a related feedback signal. The feedback signal can be supplied over the circuit 68 to the input balancing circuit 63. Commercial chart recorders are available that include null balancing circuit means 63 and 64 for measuring and recording direct current quantities.

The trip circuit motor 66 may be adjusted to operate a fixed time after the signal from the amplifier 64 raises above a background level, with the time delay being related to the passage of a fixed quantity of material past the detecting probe 26. The quantity of material of course will depend upon the flow rate and the diameter of the pipe. Similarly, the trip circuit motor 66 can be adjusted to operate whenever the signal from the amplifier 64 exceeds a preset level. By adjusting the trip circuit motor 66 to operate at various points in the signal from the detector 26 one can operate the flow meter register at predetermined points. Normally, it is desired to operate the flow meter register at the peak value of the signal from the detector 26 since the peak value corresponds exactly with the point at which the fluid was injected into the pipeline. The trip circuit motor 66 opens a microswitch 69 that removes power from a relay coil 72. When the relay coil 72 is de-energized it opens the contacts 73 which removes power from the locking relay 54 and the receiving relay 52 shown in FIGURE 4. This effectively removes power from the solenoid 57 with the de-energizing of the solenoid 57 being used to control the meter registers 29 and 30. Thus, it is seen that the meter registers 29 and 30 can be started at the time that the fluid marker is injected into the pipeline and stopped when the peak of the fluid marker passes the detecting station 26.

The operation of the circuit of FIGURE 5 provides a means whereby the operation of the meter registers 29 and 30 may be controlled in response to the passage of the expendable marker. Further the circuit will permit the operation of the meter registers in response to any particular pre-established point on the signal generated by the passage of the marker.

Figure 6:
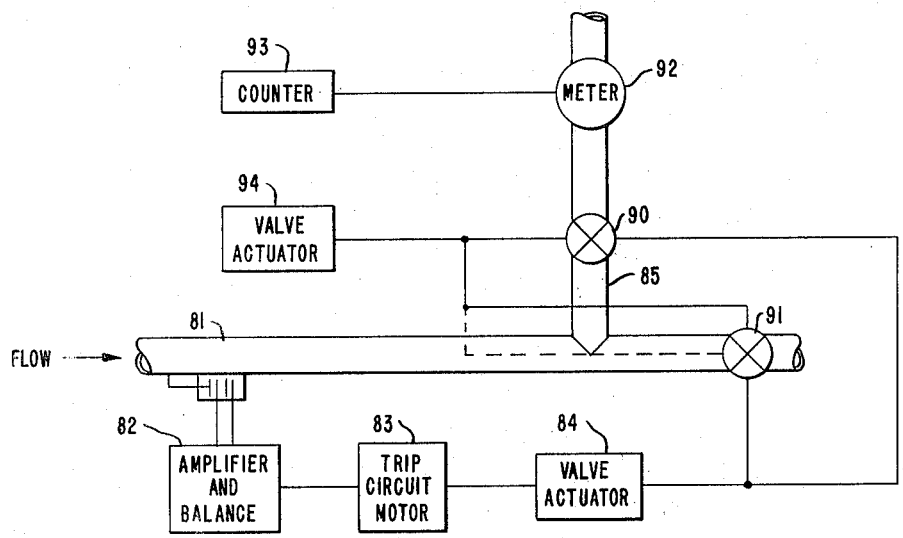
FIGURE 6 is a block diagram showing the use of this invention to control a take off station on a pipeline.

Referring now to FIGURE 6 there is shown in block diagram form an apparatus suitable for utilizing the expendable plug of this invention to automatically operate a takeoff line valve to remove a fixed amount of fluid from the main pipeline. The detecting probe 26 of FIGURE 1 is installed in the pipeline at a position 81. The detecting probe is coupled to an instrumentation package 82 which includes the input and balancing circuit 63 and amplifier 64 of FIGURE 5. The instrument package 82 preferably is designed to detect the probe signal level and supply an output signal to the trip motor circuit 83. The trip motor circuit 83 is coupled to a valve actuator 84 that operates valves 90 and 91. The valve 90 is disposed in a branch takeoff line 85 that is located a known distance downstream from the detecting station 81. The valve 91 is disposed in the main pipeline adjacent the branch takeoff line 85. Thus, the valve actuator 84 can operate the valves 90 and 91 to divert the fluid from the main line to the branch line 85 a predetermined time after the expendable plug has passed the detecting station 51. The time will depend on the distance between the detecting station 81 and the branch line 85 and the point in the expendable plug where it is desired to divert the stream. The expendable plug can be used to indicate the point at which it is desired to divert the main stream or the interface between two different fluids.

After the main stream has been diverted, the meter 92 will measure the flow through the branch line 85. The meter 92 may be a turbine type meter that supplies a pulse for each predetermined quantity of fluid passing through the meter. The meter 92 is coupled to a suitable counter 93 that counts the pulses from the meter. The counter 93 is preferably of the type that can be preset to count a predetermined number of pulses from the meter 92 and then actuate a valve actuator 94. The valve actuator 94 is coupled to valves 90 and 91 in a manner to close valve 90 and open valve 91. Thus the system of FIGURE 6 will divert a desired quantity of fluid from the main stream into the branch stream 85. The point at which the fluid is diverted from the main stream is determined by the placement of the expendable plug or marker in the fluid while the quantity is determined by the combination of the meter 92 and counter 93.

From the above description it is easily seen that by using the conductivity markers of this invention as an expendable plug one can easily operate takeoff valves to remove the preset quantity of fluid from a main pipeline or prove flow meters. As explained above the fluid used for the conductivity marker is compatible with the petroleum products transported in the pipeline. Further, only a very small quantity of fluid is required to adequately mark a point in a flowing stream as for example, an interface between two different products. Since only a small quantity is used, the material does not chemically change the petroleum products. Further, the use of a very small quantity permits one to inject the required quantity rapidly and thus accurately mark or flag a particular point along a flowing stream in a pipeline.

Of course the expendable plug of this invention can be used to initiate other operations along a pipeline for example the operation of valves on manifolds or tank farms, starting and stopping of pumps and other functions. While certain circuits and equipment have been described for use with the expendable plug material of this invention obviously other circuits can be used. For example other injectors could be used as well as different circuits for detecting the passage of the expendable plug.

I claim as my invention:

A process for identifying the passage of a particular point on a flowing stream of hydrocarbons comprising:
  injecting into the stream at the particular point a small quantity of a liquid containing a salt of a metal having an atomic number 22 to 28 and a relatively high molecular weight organic acid, the quantity of liquid injected being sufficient to change to a detectable degree the conductivity of the stream at a detection station, said quantity in addition being sufficiently small to produce a mixture of less than 100 parts per million at the detecting station; and
  detecting the passage of the injected liquid at said detecting station by monitoring its electrical conductivity and performing a control function in response to said detection.

References Cited by the Examiner
UNITED STATES PATENTS

| | | | |
|---|---|---|---|
| 1,616,481 | 2/1927 | Allen | 73—194 |
| 2,353,382 | 7/1941 | Barrett | 73—194 |
| 3,013,868 | 12/1961 | Skei et al. | 44—62 |
| 3,028,744 | 4/1962 | Bagwell et al. | 73—3 |

LOUIS R. PRINCE, *Primary Examiner.*

S. C. SWISHER, *Assistant Examiner.*